United States Patent
Balzer et al.

(10) Patent No.: US 8,162,388 B2
(45) Date of Patent: Apr. 24, 2012

(54) MULTIPLE TUBE BODY SIDE CONSTRUCTION FOR AUTOMOBILES

(75) Inventors: Jason Balzer, Walled Lake, MI (US); Lawrence Queener, Pinckney, MI (US); James Lowe, Temperance, MI (US); Dean Gericke, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 983 days.

(21) Appl. No.: 11/480,618

(22) Filed: Jul. 3, 2006

(65) Prior Publication Data

US 2008/0001437 A1    Jan. 3, 2008

(51) Int. Cl.
*B62D 25/06* (2006.01)

(52) U.S. Cl. .................................... 296/203.03

(58) Field of Classification Search ............. 296/203.03, 296/205, 210, 29, 102, 190.08, 193.06, 208; 280/756
See application file for complete search history.

(56) References Cited

U.S. PATENT DOCUMENTS

| | | | | |
|---|---|---|---|---|
| 1,767,825 A * | 6/1930 | Terres | | 296/29 |
| 2,185,345 A * | 1/1940 | Krogh | | 296/210 |
| 3,292,969 A * | 12/1966 | Eggert, Jr. | | 296/205 |
| 3,622,177 A * | 11/1971 | Notestine et al. | | 280/756 |
| 4,826,238 A * | 5/1989 | Misono et al. | | 296/209 |
| 4,917,435 A * | 4/1990 | Bonnett et al. | | 296/190.08 |
| 4,986,597 A * | 1/1991 | Clausen | | 296/205 |
| 5,096,254 A * | 3/1992 | Sparke | | 296/193.06 |
| 5,201,566 A * | 4/1993 | Mori | | 296/192 |
| 5,213,386 A * | 5/1993 | Janotik et al. | | 296/29 |
| 5,269,585 A * | 12/1993 | Klages et al. | | 296/205 |
| 5,338,080 A * | 8/1994 | Janotik et al. | | 296/29 |
| 5,549,352 A * | 8/1996 | Janotik et al. | | 296/209 |
| 5,660,427 A * | 8/1997 | Freeman et al. | | 296/190.08 |
| 5,720,511 A * | 2/1998 | Benedyk | | 296/203.01 |
| 5,779,271 A * | 7/1998 | Dorow et al. | | 280/751 |
| 5,839,777 A * | 11/1998 | Vlahovic | | 296/205 |
| 6,022,070 A * | 2/2000 | Ashina et al. | | 296/205 |
| 6,092,865 A * | 7/2000 | Jaekel et al. | | 296/205 |
| 6,139,094 A * | 10/2000 | Teply et al. | | 296/203.03 |
| 6,189,962 B1 * | 2/2001 | Henderson | | 296/218 |
| 6,260,912 B1 * | 7/2001 | Mondragon Sarmiento et al. | | 296/190.08 |
| 6,419,304 B1 * | 7/2002 | Richardson et al. | | 296/190.03 |

(Continued)

FOREIGN PATENT DOCUMENTS

JP    03136979 A  *  6/1991

(Continued)

*Primary Examiner* — Glenn Dayoan
*Assistant Examiner* — Paul Chevenert
(74) *Attorney, Agent, or Firm* — Frederick Owens, Esq.; Miller Law Group, PLLC

(57) ABSTRACT

A body side construction for an automotive vehicle is formed from multiple tubular members arranged to maximize the strength of the body side members while minimizing the amount of material utilized in the manufacture of the body side members and, thus reducing the cost of manufacture of the automobile. The body side members are formed from tubular members preferably manufactured through a hydroforming process. The tubular members extend from the front pillar to the rear pillar and can vary in number and in size as appropriate for the load being carried by the body side members. The tubular members can also be used to transition from the body side portion of the automobile to the roof structure to provide an integrated frame assembly. The formation of the body side members from multiple tubular members also creates an internal reinforcement web to further enhance the strength of the section.

8 Claims, 6 Drawing Sheets

U.S. PATENT DOCUMENTS

| | | | |
|---|---|---|---|
| 6,508,505 B1 * | 1/2003 | Perry | 296/187.06 |
| 6,523,879 B2 * | 2/2003 | Mizuta | 296/71 |
| 6,543,841 B1 * | 4/2003 | Ohkubo | 296/210 |
| 6,896,319 B1 * | 5/2005 | Huang et al. | 296/193.04 |
| 6,921,077 B1 * | 7/2005 | Pupo | 296/102 |
| 6,976,730 B2 * | 12/2005 | Mally et al. | 296/203.03 |
| 7,044,535 B2 * | 5/2006 | Durand | 296/203.01 |
| 7,077,459 B2 * | 7/2006 | Toth et al. | 296/1.78 |
| 7,128,363 B2 * | 10/2006 | Fischer | 296/108 |
| 7,213,874 B2 * | 5/2007 | Osterberg et al. | 296/210 |
| 7,237,832 B2 * | 7/2007 | Saeki | 296/193.06 |
| 7,243,985 B2 * | 7/2007 | Yatabe et al. | 296/203.04 |
| 7,246,846 B2 * | 7/2007 | Shioji et al. | 296/190.11 |
| 7,322,106 B2 * | 1/2008 | Marando et al. | 29/897.2 |
| 7,488,022 B2 * | 2/2009 | Belwafa et al. | 296/29 |
| 7,543,882 B2 * | 6/2009 | Day et al. | 296/193.06 |
| 7,614,687 B2 * | 11/2009 | Nakamura et al. | 296/193.06 |
| 8,029,044 B2 * | 10/2011 | Akahane et al. | 296/190.11 |
| 2001/0033096 A1 * | 10/2001 | Hanyu | 296/203.01 |
| 2002/0190543 A1 * | 12/2002 | Hanyu | 296/203.03 |
| 2002/0190544 A1 * | 12/2002 | Yamamoto et al. | 296/205 |
| 2004/0080182 A1 * | 4/2004 | Adams et al. | 296/190.02 |
| 2005/0200164 A1 * | 9/2005 | Reed et al. | 296/203.03 |
| 2006/0028053 A1 * | 2/2006 | Turnbull et al. | 296/190.08 |
| 2006/0097549 A1 * | 5/2006 | Fischer et al. | 296/203.03 |
| 2007/0176467 A1 * | 8/2007 | Watanabe et al. | 296/210 |
| 2008/0164707 A1 * | 7/2008 | Belwafa et al. | 296/29 |
| 2008/0203768 A1 * | 8/2008 | Lowe | 296/205 |
| 2010/0237661 A1 * | 9/2010 | Baccouche et al. | 296/210 |

FOREIGN PATENT DOCUMENTS

| | | | | |
|---|---|---|---|---|
| JP | 04031125 A | * | 2/1992 | |
| JP | 06001262 A | * | 1/1994 | 296/203.01 |

* cited by examiner

Fig. 5
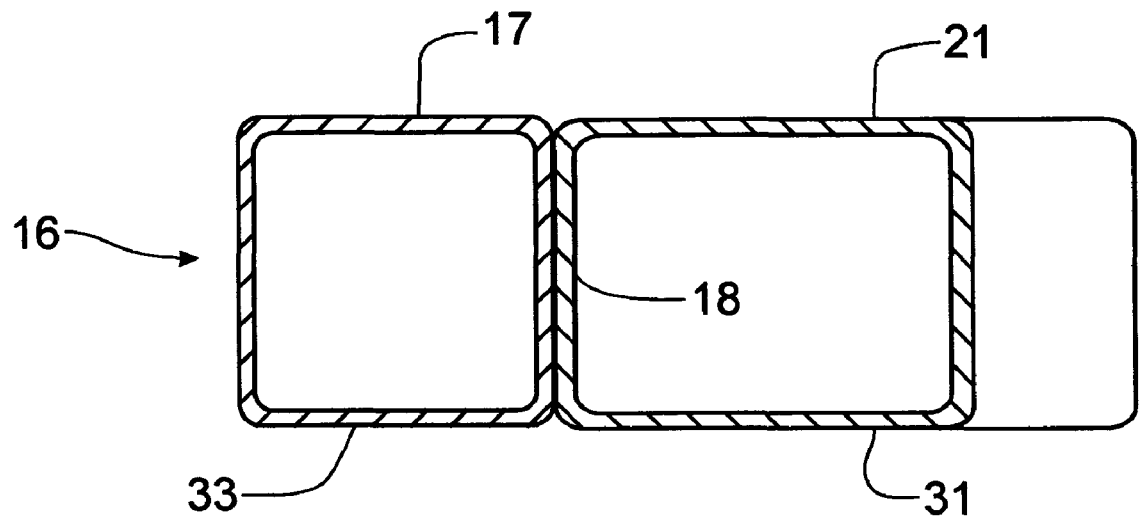
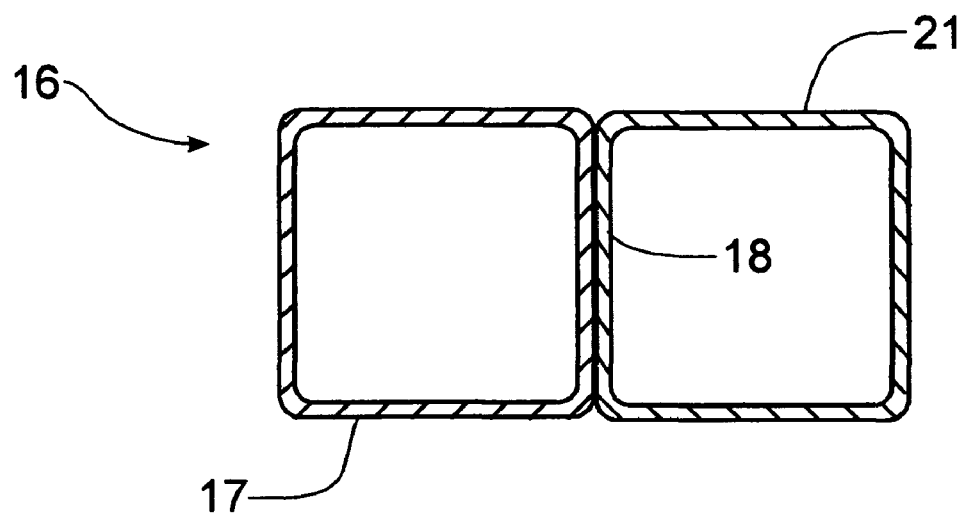
Fig. 6

MULTIPLE TUBE BODY SIDE CONSTRUCTION FOR AUTOMOBILES

FIELD OF THE INVENTION

This invention relates to the frame of an automotive vehicle and, more particularly, to a body side configuration utilizing hydroforming technology.

BACKGROUND OF THE INVENTION

The frame of an automotive vehicle supports an operator's compartment and includes a roof supported by generally vertical members commonly referred to as pillars. For some vehicles, the roof is normally supported by front and rear pillars, also known as the "A" and "B" pillars. Other vehicle configurations can include front and rear pillars with a support pillar between the front and rear pillars, in which case the front and rear pillars would be referred to as the "A" and "C" pillars and the intermediate pillar would be the "B" pillar. The frame of the vehicle is required to withstand certain forces relating to roof strength of the vehicle. Those roof strength standards help determine the configuration of the vehicle frame. Automotive vehicles are often designed with an operator's compartment that includes a rear passenger seat and a set of rear doors that can be hinged on the rear pillars to provide an open span between the front and rear pillars when the front and rear doors are opened, or mounted on the intermediate pillar for opening in the same direction as the front doors.

These different frame configurations have a direct impact on the design of the frame components of the automobile. The longer the unsupported open span, such as can be found on some pick-up trucks where the rear door hinges on the rear "B" pillar, the greater the challenge to support the load that must be transferred into the frame components to meet roof strength requirements. The longer unsupported roof spans also, consequentially, increase the moment applied to the base of the rear pillar of the operator's cab in vehicles, such as pick-up trucks.

The known design strategy for the frame components forming the body side construction of an automotive vehicle is to manufacture these components through stamping and bending of sheet metal to form the individual frame components with a generally uniform cross-section that is consistent with these known manufacturing processes. The size and shape of the cross-sectional configuration of the respective individual component is dictated by the strength required at the highest load point asserted on that individual component. Efforts have been made over the years to modify the shape of the cross-section and the thickness of the sheet metal in attempts to maintain the requisite strength parameters while reducing the weight of the respective frame components, and thus the cost of production thereof. Nevertheless, maintaining the generally uniform size and shape of the individual frame component results in a part or component that weighs more than required to carry the load.

Thus, it would be desirable to provide a body side construction for automobiles that can be tailored to correspond to the load encountered by the individual frame components by varying the cross-sectional size and/or shape as appropriate to carry the load distribution imposed thereon.

SUMMARY OF THE INVENTION

It is an object of this invention to overcome the aforementioned disadvantages of the known prior art by providing a body side construction for automotive vehicles that is formed from multiple tubular members.

It is another object of this invention to provide a body side construction for automobiles that can be selectively tailored to carry the load imposed thereon along each respective portion of the individual frame members.

It is a feature of this invention that the body side construction can be formed from multiple tubular members that can be positioned and oriented to carry the loading along the length of each respective portion of the body side members.

It is an advantage of this invention that the tubular members can be formed through a hydroforming process.

It is another feature of this invention that body side construction for automotive vehicles can carry an extra tubular member where heavy loads are encountered.

It is another advantage of this invention that the tubular members can be oriented to extend from the body side portion of the automotive frame across the roof structure of the automobile.

It is still another advantage of this invention that the cross-sectional size of each tubular member can be varied as appropriate to carry the load along the length of the body side members.

It is still another feature of this invention that the cross-section of the body side members, as reflected in the tubular members joined together to form the body side member, can be varied to maximize the strength of the body side members.

It is yet another advantage of this invention that the cost of construction of the body side members for an automotive vehicle can be reduced by the appropriate distribution and deployment of tubular members forming the body side construction of the vehicle.

It is another object of this invention to provide a multiple tube body side construction for an automotive vehicle that is durable in construction, inexpensive of manufacture, carefree of maintenance, facile in assemblage, and simple and effective in use.

These and other objects, features and advantages are accomplished according to the instant invention by providing a body side construction for an automotive vehicle that is formed from multiple tubular members arranged to maximize the strength of the body side members while minimizing the amount of material utilized in the manufacture of the body side members and, thus reducing the cost of manufacture of the automobile. The body side members are formed from tubular members preferably manufactured through a hydroforming process. The tubular members extend from the front pillar to the rear pillar and can vary in number and in size as appropriate for the load being carried by the body side members. The tubular members can also be used to transition from the body side portion of the automobile to the roof structure to provide an integrated frame assembly. The formation of the body side members from multiple tubular members also creates an internal reinforcement web to further enhance the strength of the section.

BRIEF DESCRIPTION OF THE DRAWINGS

The advantages of this invention will become apparent upon consideration of the following detailed disclosure of the invention, especially when taken in conjunction with the accompanying drawings wherein:

FIG. 5 is an enlarged cross-sectional view of the body side member corresponding to lines 5-5 of FIG. 4;

FIG. 6 is an enlarged cross-sectional view of the body side member taken along lines 6-6 of FIG. 4;

DETAILED DESCRIPTION OF THE PREFERRED EMBODIMENT

Figure 1:
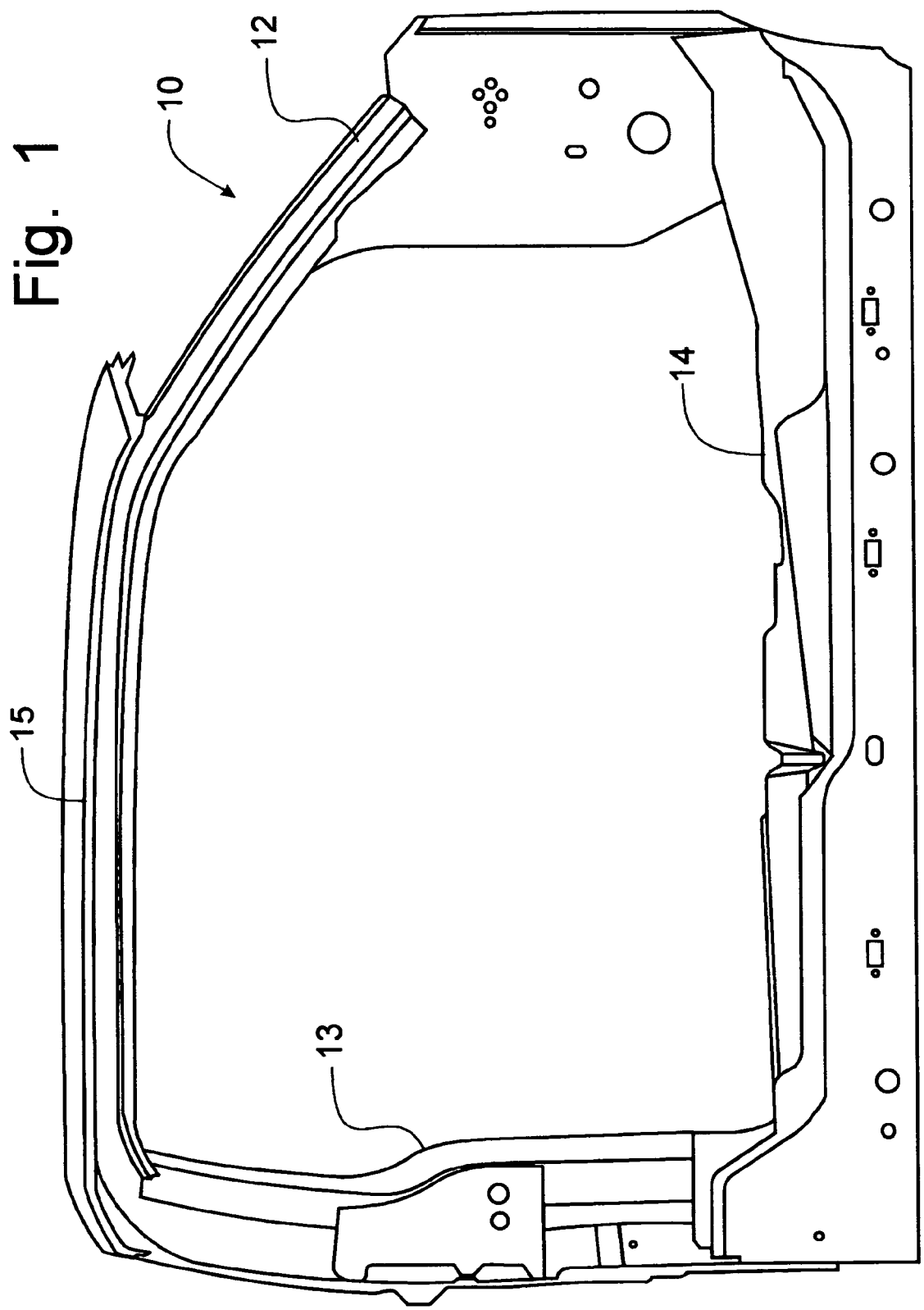
FIG. 1 is a side elevational view of a body side frame construction for an automotive vehicle incorporating the principles of the instant invention.

Referring to the drawings, a body side frame construction for an automotive vehicle, such as an operator's cab of a pick-up truck, can be seen. Any right or left references are used as a matter of convenience and are determined by standing at the rear of the vehicle and facing forward into the normal direction of forward travel. The body side frame construction 10 includes a front pillar 12, a rear corner pillar 13 and a roof structure 15 extending between the front and rear pillars 12, 13. The frame 10 of the operator's cab is formed with a generally vertical front (or "A") pillar 12 extending between the floor member 14 and the roof structure 15. The rear pillar 13 completes the generally rectangular configuration of the body side frame construction 10 and is intended to mount by hinges (not shown) both front and rear doors (not shown). The front door will normally hinge on the front "A" pillar 12, while the rear "B" pillar can support the hinges for the rear door. The roof structure 15 extends from the right side of the vehicle to the left side over top of the operator's cab, spanning between the transversely spaced front and rear corner pillars 12, 13. The left and right sides of the vehicle are substantially identical mirror images of one another.

Each of the rear corner pillars 13, though only one is depicted in the drawings, is formed in a dual cell configuration. Preferably the roof structure 15 will engage the rear corner pillar 13 in a manner to provide a smooth and integral transition from the rear pillar 13 into the roof side rails 16. The roof side rails 16 extend forwardly and eventually forwardly and downwardly to create the front "A" pillar 12.

Figure 2:
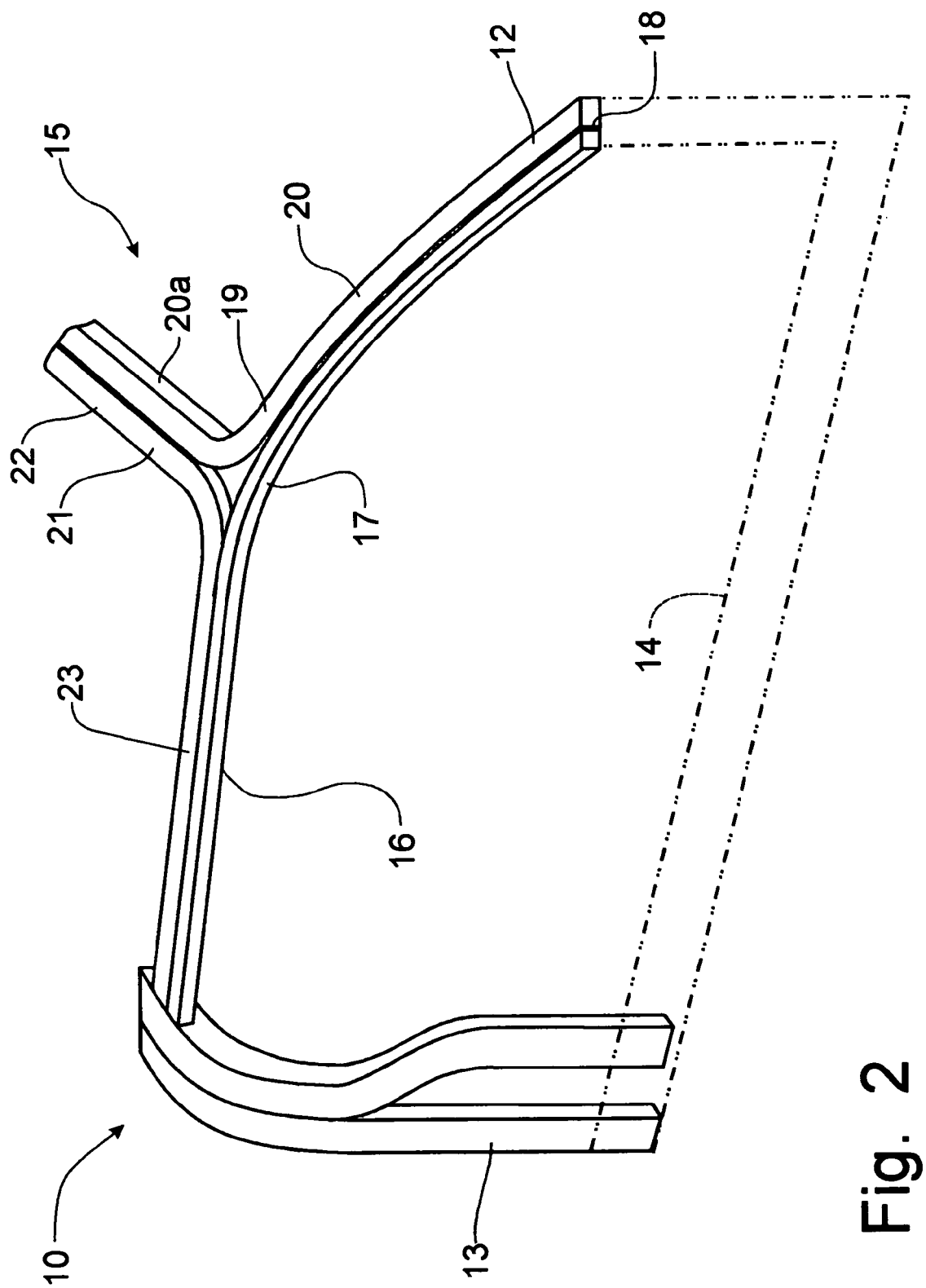
FIG. 2 is a partial perspective view of a first embodiment of the body side frame construction showing the respective tubular members.
Figure 3:
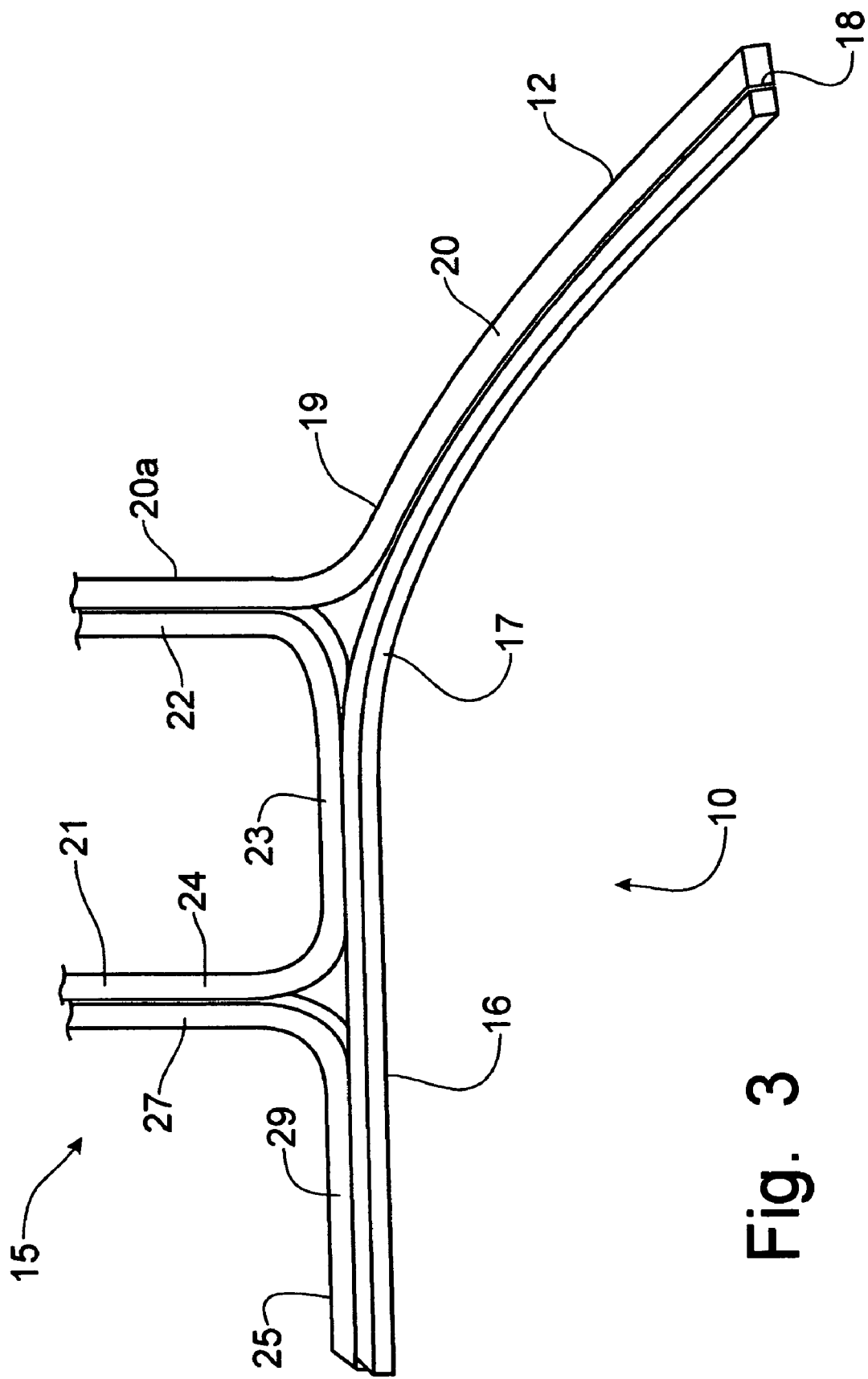
FIG. 3 is a partial perspective view of a second embodiment of the body side frame construction showing the deployment of multiple tubular members forming the body side members.
Figure 4:
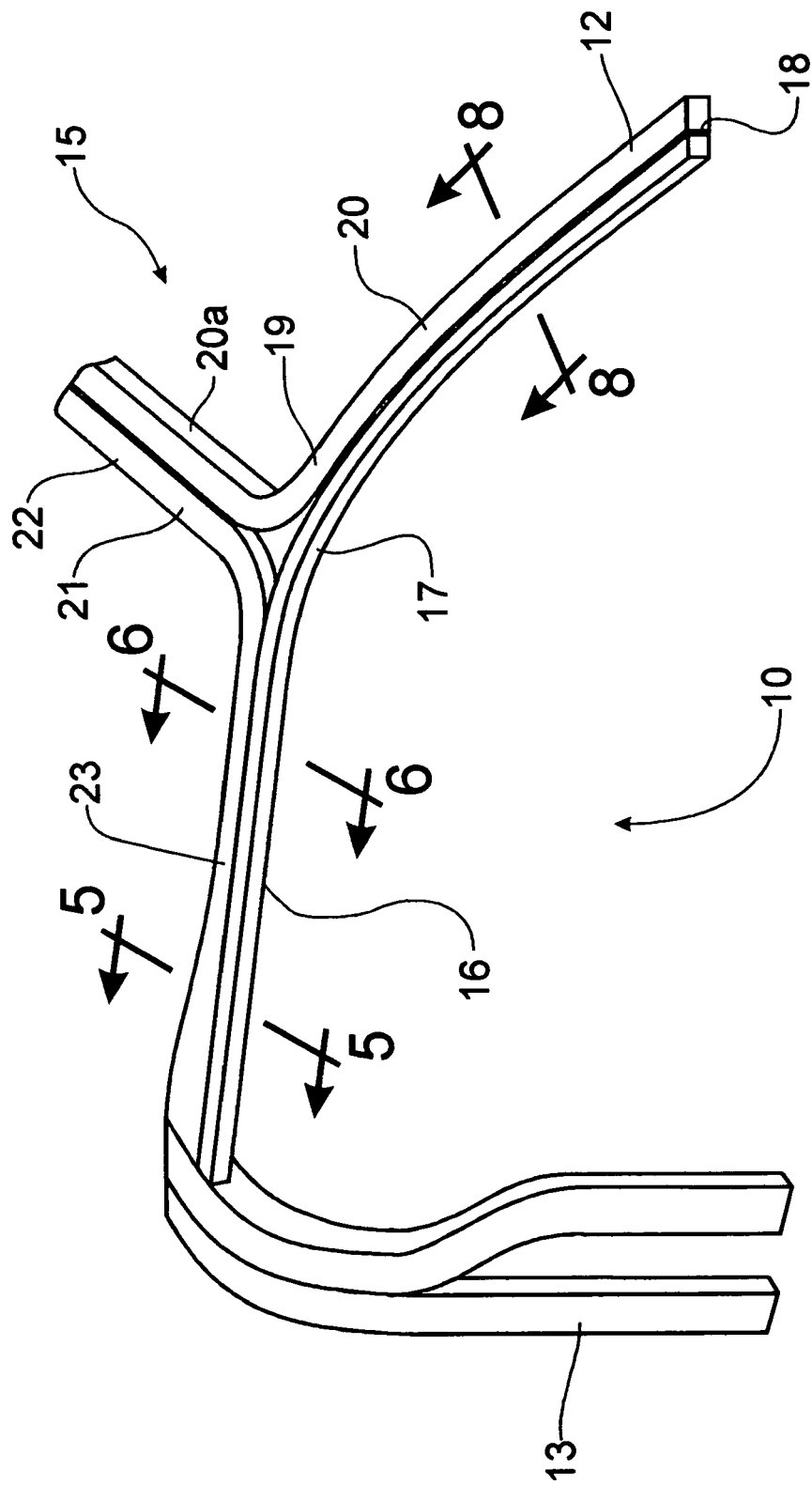
FIG. 4 is a partial perspective view of another alternative embodiment of the body side frame construction.

As can be seen in FIGS. 2-4, the front "A" pillar 12 is integrally formed with the roof side rails 16. These components of the body side construction 10 are formed from tubular members, including a rail outer tube 17 that preferably extends from the front "A" pillar 12 to the rear corner pillar 13, a roof header rail 19, and a front roof rail 21. The roof header rail 19 can have a forward portion 20 that co-extends along the rail outer tube 17 to form the front pillar 12. The roof header rail 19 bends at the top end of the front pillar 12 to form a header portion 20a that projects across the front edge of the roof structure 15 toward the opposing roof header rail (not shown) from the opposing body side construction. The front roof rail 21 is formed with a front leg 22 that extends along the front portion of the roof structure 15 next to and rearwardly of the roof header rail 19 and bends rearwardly into a side portion 23 at the top of the front pillar 12 to extend rearwardly along the rail outer tube 17 toward the rear corner pillar 13. The full roof structure 15 is formed when the corresponding side body frame members are welded together at the center of the roof structure 15.

In the embodiment depicted in FIG. 3, the roof structure 15 requires additional structural support from the body side frame construction. To provide the additional strength required for the roof structure 15 in this particular embodiment, the front roof rail 21 is formed in a U-shape such that a rear leg 24 is integrally formed with the front leg 22 and the side portion 23 and the rear leg 24 extends across the roof structure 15 generally parallel to the front leg 22. A rear roof rail 25 is utilized to complete the roof structure 15. The rear roof rail 25 is formed with a front leg 27 that is positioned behind the rear leg 24 of the front roof rail 21 and bends into a side portion 29 next to the rail outer tube 17 to extend along the rail outer tube 17 to the rear pillar 13.

One skilled in the art can see that the formation of the body side frame components by tubular members allows the roof structure 15 to be integrally formed with the roof side rail 16 and the front pillar 12 without sacrificing strength. The adjacent tubular rail outer tube 17 and the forward portion 20 of the roof header rail 19 form a strong front pillar 12 with an internal reinforcement web 18 created by the adjacent walls of the tubular members increasing the strength of the front pillar section. Furthermore, the rail outer tube 17 can be a two inch tubular member that extends substantially uniformly from the lower end of the front pillar 12 to the rear pillar 13. As such, the rail outer tube 17 can be roll-formed. This size of tubular member can meet the minimum strength requirements of the roof side rail 16, while the addition of the other tubular members 19, 21 and 25, bolster the strength of the rail outer tube 17 to meet the maximum strength requirements.

As is best seen in FIGS. 4-6, the tubular members 19, 21 and 25 can be formed with varying cross-sectional size and shape to supplement the properties of the rail outer tube 17 to meet the strength requirements of any particular part of the body side frame members, 12, 16. Accordingly, the rail outer tube 17 may be formed through conventional bending and forming processes, while the other tubular members, 19, 21, and 25 would preferably be formed through a hydroforming process so that the size and shape of the member can be varied as desired along the longitudinal length of the member. As depicted in FIGS. 5 and 6, any particular portion 31 of the additional tubular members can be formed through the hydroforming process to have a larger and stronger cross-sectional configuration that the smaller portion 33.

Figure 7:
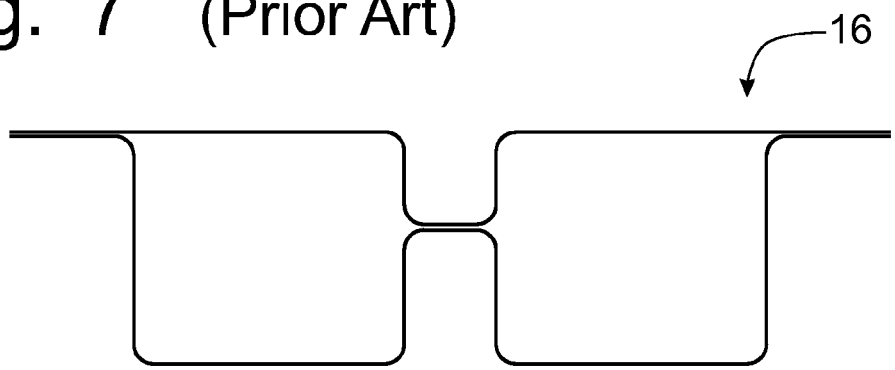
FIG. 7 is a cross-sectional view of the prior art stamped and welded body side rail configuration.

Accordingly, instead of one large heavy gauge tube or a stamped and welded body side rail, as is depicted in FIG. 7, where the strength provided by the large heavy gauge member is only needed at one spot along the length of the body side rail 16, the body side rail 16 is formed from individual tubular members that provide the required strength where needed, but reduces the size of the cross-section of the member where the strength is not needed to reduce the amount of material required to form the body side construction 10. Less material results in less weight for the automobile and, therefore, less cost of manufacture. Accordingly, the rail outer tube 17 can provide the strength needed for the body side rail 16 at the least loaded spot along the longitudinal length of the body side rail 16. The joining of the additional tubular members 19, 21, and 25 to the rail outer tube 17 increases the strength of the body side construction 10 to correspond to the load imposed at any particular spot along the body side construction 10. Since the hydroforming process can result in changes in the size and shape of the cross-section of the tubular member along the length of the member, as is reflected in the cross-sectional views of FIGS. 5 and 6, the joining of the additional tubular members 19, 21 and 25 can be tailored exactly to the properties required at any particular spot along the body side frame members.

Figure 8:
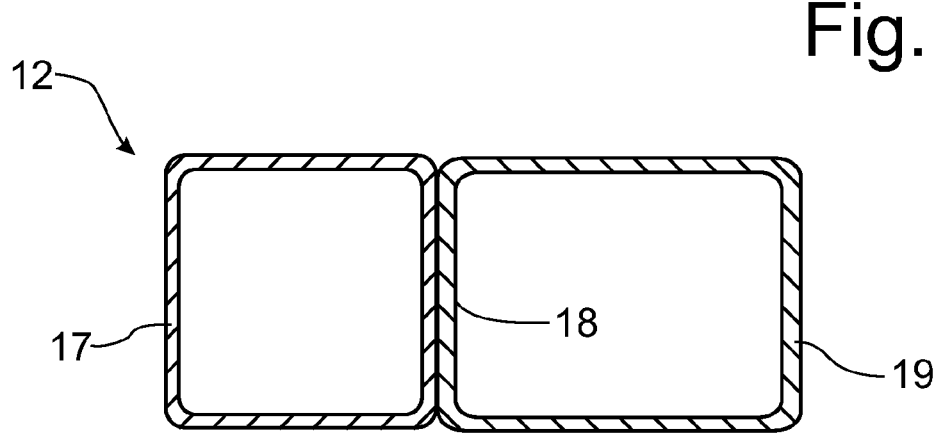
FIG. 8 is an enlarged cross-sectional view of the front pillar with side by side tubular members taken along lines 8-8 of FIG. 4.
Figure 9:
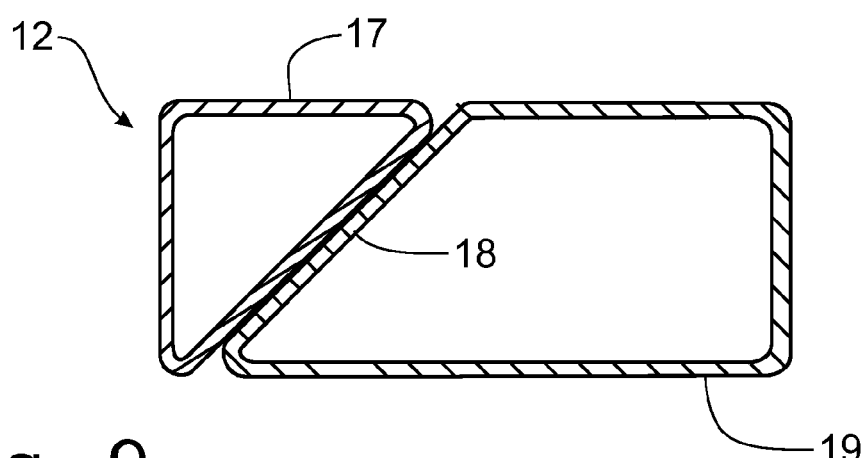
FIG. 9 is a cross-sectional view of an alternative embodiment of the front pillar corresponding to the cross-sectional view of FIG. 8.

The utilization of the hydroforming process can provide a tailor made frame component that has the strength properties required for any particular loading application. For example, the adjacent tubular members 17 and 19 forming the front pillar 12 could be arranged as depicted in FIG. 8 in a side-by-side arrangement with the internal reinforcement web 18 oriented substantially vertically. Alternatively, the co-extending tubular members 17, 19 could be arranged on top of one another, or formed generally triangularly, as is depicted in FIG. 9, to create a diagonally oriented internal reinforcing web 18, which provides different properties than the configuration depicted in FIG. 8. The configuration of the rail outer tube 17 need not be confined to a bent tubular member having a substantially uniform cross-sectional configuration along substantially the entire length of the member 17. The rail outer tube 17 could also be tailor formed through the hydroforming process to vary the cross-sectional size and shape as desired along the longitudinal length thereof.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive vehicle body side frame having a front pillar, a rear pillar spaced longitudinally rearwardly of the front pillar, and a roof structure interconnecting the front and rear pillars, the roof structure including a roof side rail extending between the front and rear pillars, the improvement comprising:
   the roof side rail and the front pillar being formed from multiple tubular members including a rail outer tube, a roof header rail, a front roof rail, and a rear roof rail, configured such that:
   the front pillar being formed by a portion of the rail outer tube and a forward portion of the roof header rail extending along the rail outer tube;
   the roof side rail being formed from the rail outer tube, a side portion of the front roof rail extending along the rail outer tube and a side portion of the rear roof rail;
   the front roof rail further including a front leg oriented generally perpendicularly to the side portion of the front roof rail and a rear leg oriented generally parallel to the front leg and spaced rearwardly therefrom, the front leg of the front roof rail being joined with a corresponding front leg of the roof header rail to form a first transverse portion of the roof structure, the rear leg of the front roof rail being joined to a front leg of the rear roof rail to form a second transverse portion of the roof structure rearward of the first transverse structure; and
   the rear pillar being formed by vertically oriented members independent of the roof side rail, the rail outer tube and the side portion of the rear roof rail joining the rear pillar and extending generally orthogonally therefrom.

2. The body side frame of claim 1 wherein the front roof rail is formed in a U-shaped configuration to mate against the roof header rail, the rear roof rail and the rail outer tube.

3. The body side frame of claim 2 wherein the roof header rail and the front roof rail are formed through a hydroforming process, the front roof rail being formed with varying cross-sectional configurations.

4. The body side frame of claim 3 wherein the rail outer tube is manufactured through a roll-forming process and presents a generally uniform cross-sectional configuration.

5. An automotive side body construction comprising:
   a rail outer tube forming a portion of a front pillar and extending rearwardly to a rear pillar to form a portion of a roof side rail;
   a roof header tubular rail having a forward portion extending adjacent to the rail outer tube to form the front pillar therewith and a header portion extending generally transversely of the forward portion to form a portion of a roof structure; and
   a front roof tubular rail having a side portion extending adjacent to the rail outer tube to form at least a portion of the roof side rail therewith and a front leg extending transversely of the side portion to mate with the header portion of the roof header tubular rail in forming a portion of the roof structure, the roof side rail, formed by the side portion of the front roof tubular rail and the rail outer tube, being joined to the rear pillar, formed by vertically oriented members independent of the roof side rail, to extend generally orthogonally therefrom.

6. The automotive side body construction of claim 5 further comprising:
   a rear roof tubular rail having a side portion extending adjacent to the rail outer tube to form a portion of the roof side rail extending forwardly of the rear pillar, the rear roof tubular rail having a front leg extending transversely of the side portion of the rear roof tubular rail, the front roof tubular rail further including a rear leg extending transversely of the side portion of the front roof tubular rail adjacent the front leg of the rear roof tubular rail.

7. The automotive side body construction of claim 5 wherein at least one of the roof header tubular rail and the front roof tubular rail are hydroformed to provide a varying cross-sectional configuration.

8. The automotive side body construction of claim 7 wherein the rail outer tube is formed with a generally uniform cross-sectional configuration.

* * * * *

UNITED STATES PATENT AND TRADEMARK OFFICE
CERTIFICATE OF CORRECTION

PATENT NO. : 8,162,388 B2  
APPLICATION NO. : 11/480618  
DATED : April 24, 2012  
INVENTOR(S) : Jason Balzer et al.

Page 1 of 1

It is certified that error appears in the above-identified patent and that said Letters Patent is hereby corrected as shown below:

On the Title page: Item (73) Assignee: should read,

Ford Global Technologies, LLC, of Dearborn, MI, and  
Vari-Form, Inc., of Warren, MI Signed and Sealed this  
Fourth Day of September, 2012

David J. Kappos  
*Director of the United States Patent and Trademark Office*